US005396078A

United States Patent [19]

Klaus et al.

[11] Patent Number: 5,396,078

[45] Date of Patent: Mar. 7, 1995

[54] PRINTER WITH OPTICAL DATA LINK TO CARRIAGE

[75] Inventors: Richard I. Klaus; Eric L. Ahlvin, both of Vancouver, Wash.; J. P. Harmon, Corvallis, Oreg.; Steven Goss, Vancouver, Wash.

[73] Assignee: Hewlett-Packard Company, Palo Alto, Calif.

[21] Appl. No.: 125,983

[22] Filed: Sep. 22, 1993

[51] Int. Cl.[6] .................................. G02B 27/00

[52] U.S. Cl. .................................. 250/551; 346/139 R

[58] Field of Search .................. 250/551, 552, 227.11; 359/154, 195; 346/139 R; 400/335, 322, 352, 354, 320

[56] References Cited

U.S. PATENT DOCUMENTS

| | | | |
|---|---|---|---|
| Re. 33,425 | 11/1896 | Nihel | 358/472 |
| 3,689,894 | 9/1972 | Laura et al. | 340/172.5 |
| 3,750,714 | 8/1973 | Holdman, Jr. et al. | 139/16 |
| 3,852,563 | 12/1974 | Bohorquez et al. | 219/216 |
| 3,892,305 | 7/1975 | Higgins | 197/52 |
| 4,030,589 | 6/1977 | Kessler | 197/1 R |
| 4,037,705 | 7/1977 | Martin et al. | 197/1 R |
| 4,167,861 | 9/1979 | Krause et al. | 66/75.2 |
| 4,236,255 | 11/1980 | Burgener et al. | 455/603 |
| 4,525,748 | 6/1985 | Carbone | 358/286 |
| 4,611,246 | 9/1986 | Nihei | 358/256 |
| 4,695,853 | 9/1987 | Hackleman et al. | 346/140 R |
| 4,695,897 | 9/1987 | Watanabe | 358/296 |
| 4,698,647 | 10/1987 | Gerlach | 346/108 |
| 4,718,051 | 1/1988 | Ohshima et al. | 369/44 |
| 4,719,477 | 1/1988 | Hess | 346/140 R |
| 4,751,517 | 6/1988 | Crean et al. | 346/75 |
| 5,030,976 | 7/1991 | Salmon | 346/157 |
| 5,051,601 | 9/1991 | Atobe et al. | 250/551 |
| 5,088,079 | 2/1992 | Baer | 369/41.26 |
| 5,126,759 | 6/1992 | Small et al. | 346/107 R |
| 5,247,380 | 9/1993 | Lee et al. | 359/118 |

FOREIGN PATENT DOCUMENTS 2198886 10/1990 Japan .

*Primary Examiner*—David C. Nelms
*Assistant Examiner*—Steven L. Nichols

[57] ABSTRACT

A printer featuring an optical data link between the printer's controller and its reciprocal, carriage-mounted printhead is described. Print data are conveyed from the controller to the printhead via a fixed point on the edge of the carriage and status data may be conveyed in the reverse direction. Power is supplied to the printhead via dual parallel rails on which the carriage is supported for reciprocation by the chassis-mounted carriage drive motor. Preferably, the optical medium is infrared light, and uses conventional driver/receiver devices.

11 Claims, 5 Drawing Sheets

PRINTER WITH OPTICAL DATA LINK TO CARRIAGE

TECHNICAL FIELD

The present invention relates to an optical link for conveying data between a printer's controller and printhead. More particularly, the invention concerns an optical link between a controller and a printhead that eliminates the flexible ribbon cable requirement of conventional printers.

Background Art

Conventional printers having moving printheads convey data to and from the printhead from and to a printed circuit board (PCB) connector in the printer's controller via one or more expensive ribbon cables that endure thousands of bending cycles; add weight to the printhead; and require protection from radio-frequency interference (RFI), electrostatic discharge (ESD) and electromagnetic interference (EMI). Because of their bending clearance requirement on at least one end of the carriage and because of the connection requirements between the cable and the printer chassis, ribbon cables increase the footprint of a printer.

Disclosure of the Invention

The invented printer features an optical data link between the printer's controller and its reciprocating, carriage-mounted printhead. Print data is conveyed to the controller to the printhead via a fixed point on the edge of the carriage and status data is conveyed in the reverse direction. Power is supplied to the printhead via dual parallel rails on which the carriage is supported for reciprocation by a chassis-mounted carriage drive motor. Preferably, the optical medium employs infrared (IR) light, and uses conventional driver/receiver devices. Preferably, some form of data compression is helpful in achieving the high data-transfer rates required for high resolution printing. Conventional ink-jet printheads may be used, although other devices, e.g., smart drive heads (SDH), may be used. SDH devices further lighten both the power and weight burden on the printhead and make it possible further to integrate data decoder functions into the printhead.

As previously noted, conventional printhead connections use a flexible ribbon cable which generates RFI and EMI, and which may also create ESD problems. The optical link of the invention eliminates the need for a flexible ribbon electrical connection and the associated RH, EMI and ESD problems associated therewith. Printers incorporating the optical link of the invention also may be constructed with smaller dimensions because of the elimination of the flexible ribbon connector and the added height and width requirements associated with such forms of data links. Generally, a printer incorporating the optical like of the invention will be two to five centimeters smaller in their front-to-rear dimension.

These and additional objects and advantages of the present invention will be more readily understood after a consideration of the drawings and the detailed description of the preferred embodiment.

DETAILED DESCRIPTION OF THE PREFERRED EMBODIMENTS AND BEST MODE OF CARRYING OUT THE INVENTION

Figure 1:
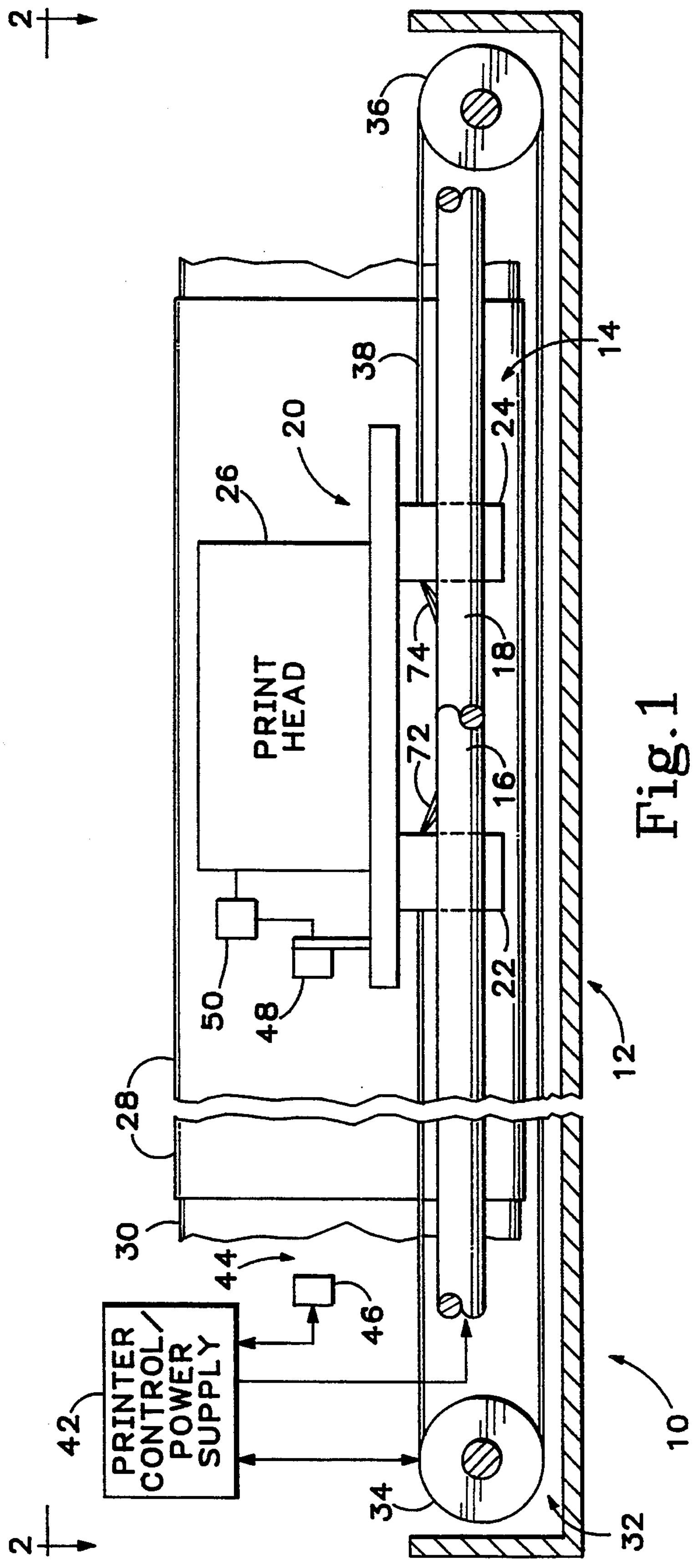
FIG. 1 is a somewhat schematic front elevation of an optically linked printhead constructed according to the invention.
Figure 2:
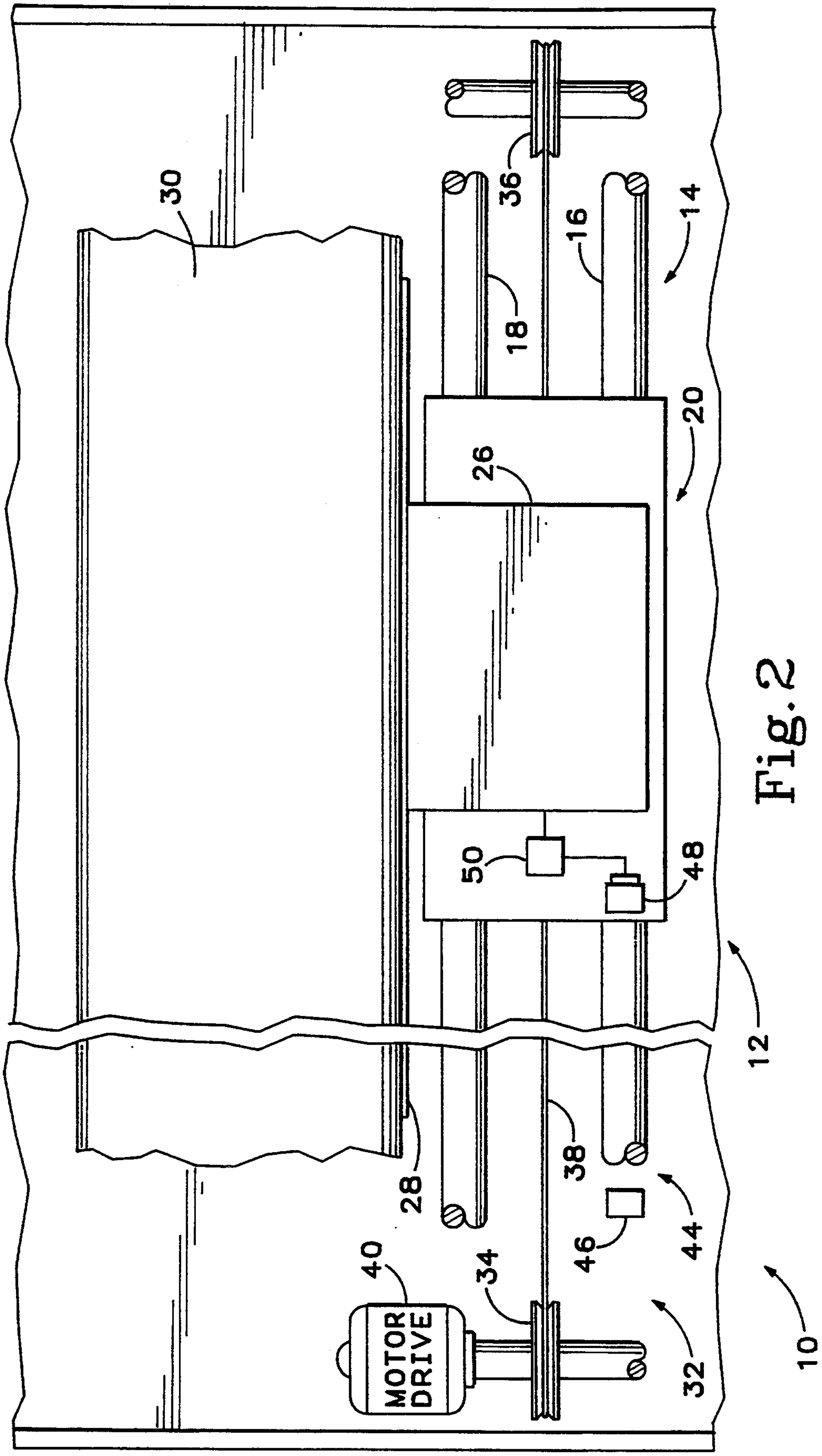
FIG. 2 is a top plan view of the printhead of FIG. 1.

Referring now to FIGS. 1 and 2, a printer is represented schematically at 10. Printer 10 includes a printer chassis 12, which is contained within a printer housing (not shown). Mounted on chassis 12 is a carriage support 14, which, in the preferred embodiment, includes dual, parallel rails 16, 18. A carriage 20 is supported on rails 16, 18 for reciprocating, bidirectional movement along a carriage path defined by rails 16, 18, the path being confined to the printer chassis. Carriage 20 includes rail-engaging guides 22, 24, which position carriage 20 on carriage support 14 and which provide stability and guidance for carriage 20. Guides 22, 24 provide additional functions, which will be described later herein.

A printhead 26 is mounted on carriage 20 and is operable to print an image on, for instance, a sheet of paper 28, which may be supported by a print roller 30, or by other well-known paper-handling instrumentalities. Printhead 26 may be of the ink-jet type, such as that which is marketed by Hewlett-Packard Co. Printhead 26 may be of the monochrome or color print type, which, again, are believed to be well-known to those of ordinary skill in the art. For purposes of this application, it should be noted that a monochrome printhead typically may produce 300 dots-per-inch (dpi) resolution and contain 100 ink-jet nozzles. A color printhead typically may produce 300 dpi resolution and contains approximately 300 ink-jet nozzles therein. The resolution is generally adjustable through software drivers for a particular printer.

Carriage 20 is reciprocated by means of a carriage transport, shown generally at 32, and typically includes a transport roller 34, 36 on either side of chassis 12, a transport cable 38 which is trained over the rollers and is attached to carriage 20 and a chassis-mounted carriage drive motor 40 which operates under the control of a printer control/power supply 42.

As previously noted, in conventional printers, the printhead is connected to the printer control/power supply by means of a flexible ribbon cable which is subject to a relatively large amount of flexing stress. Such ribbon cables result also in increased size, both in ,terms of the footprint, and the height, of the printer chassis. Such cables also generate RFI, ESD and EMI. The printer of the invention eliminates or reduces such undesirable characteristics by providing an optical data link, depicted generally at 44, between printer chassis 12 and printhead 26. Optical data link 44 includes an optical data transmitter 46, which is fixed relative to chassis 12, and an optical data receiver 48, which is located on carriage 20 and is movable therewith. Receiver circuitry, depicted by block 50, is provided so that the optical data printhead controlling signal which is received by receiver 48 may be converted into proper form and protocol for use by printhead 26. It should be appreciated that the printhead control signal represents a stream of sequential print data which is transmitted from controller 42 to printhead 26, and may also include data, such as printhead status, which is transmitted from printhead 26 to controller 42.

As previously noted, printhead 26 may be of the conventional ink-jet variety, or may be of the smart drive head (SDH) type that incorporates a portion of the printer driver into the printhead, and includes integral CMOS structures. The structure described herein greatly facilitates removal and replacement of the printhead with minimal service. This is because the entire carriage, printhead, optical data receiver and associated circuitry may be replaced as a single unit and connected to the carriage transport, without the need for disconnecting and reconnecting cables providing, for example, power and data.

Printer control 42 and receiver circuitry 50 may include buffering registers and/or compression/decompression circuitry/firmware. It should be understood that according to the invention, a continuous flow of data, in the form of one or more printhead controlling signals is passed from transmitter 46 to receiver 48 while carriage 20 traverses its carriage path on carriage support 14. The configuration depicted in FIGS. 1 and 2 defines what is referred to herein as a free-air optical data path which extends between optical data transmitter 46 and optical data receiver 48.

Transmitter 46 and receiver 48, also referred to herein as optical elements, may take the form of focussed or non-focussed LED electronics, IR diodes or transistors or other emitters and compatible receivers, as well as laser diodes or emitters and compatible photodetector receivers, as are known. In some instances, it may be necessary to modulate the intensity of the printhead controlling signal as transmitted by optical data transmitter 46. This is because the distance between transmitter 46 and receiver 48 increases, e.g., when carriage 20 is distal from the location of transmitter 46 on chassis 12, the received signal-intensity at the receiver decreases. This circuitry may be incorporated into printer control/power supply 42, or any other suitable location. Carriage position information may be supplied to controller 42 by a feedback portion of the control circuitry operatively connected, for example, to motor 40. Data flow between control/power supply 42 and printhead 26 may be unidirectional, or may be bidirectional, depending on the requirements of the controller and printhead.

Figure 3:
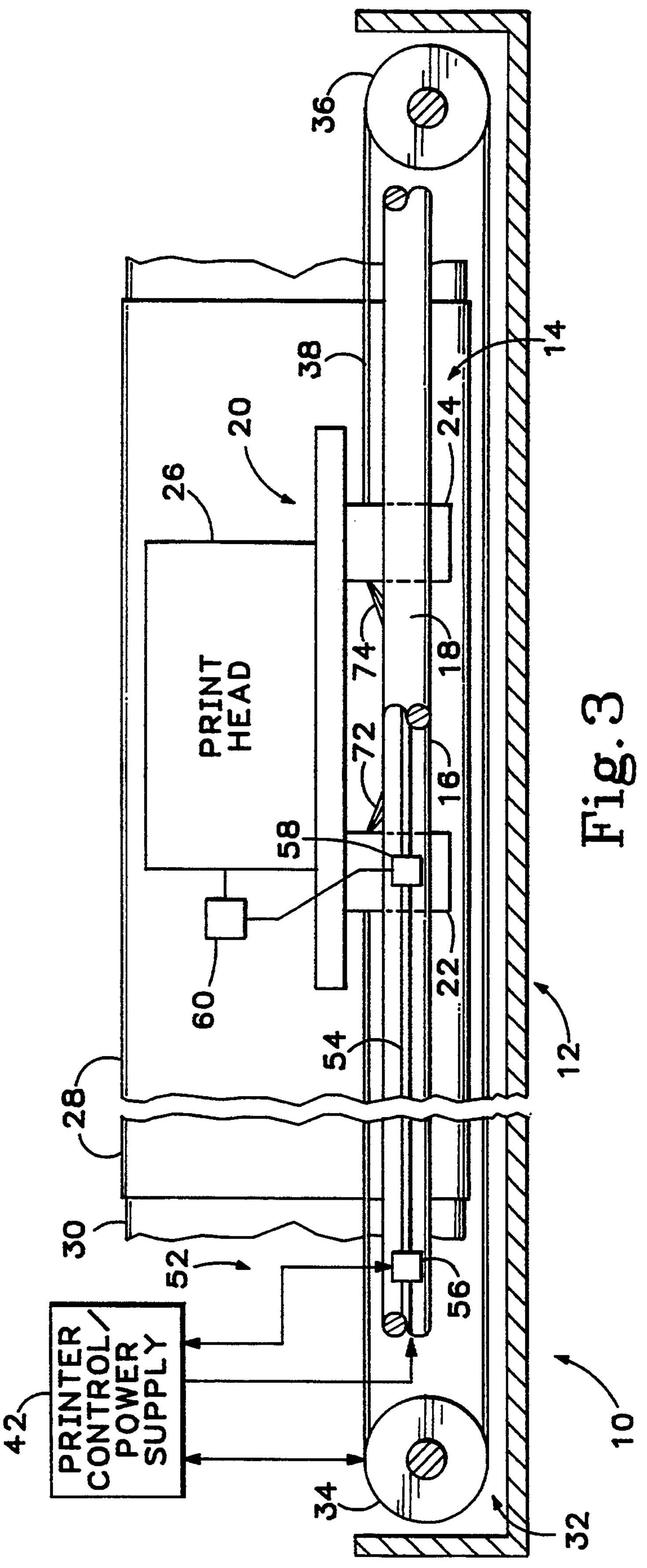
FIG. 3 is a front elevation of a second embodiment of the printhead.

Referring now to FIG. 3, a modified form of the optical data link is depicted generally at 52. In this embodiment, the optical data link includes a fiber optic cable 54 which is carded on rail 16. An optical data transmitter 56 is located so as to provide an input printhead-controlling signal into a distal end of fiber optic cable 54, the output of which is detected by an optical data receiver 58. The received signal is then passed to receiver circuitry 60 for further processing.

Figure 4:
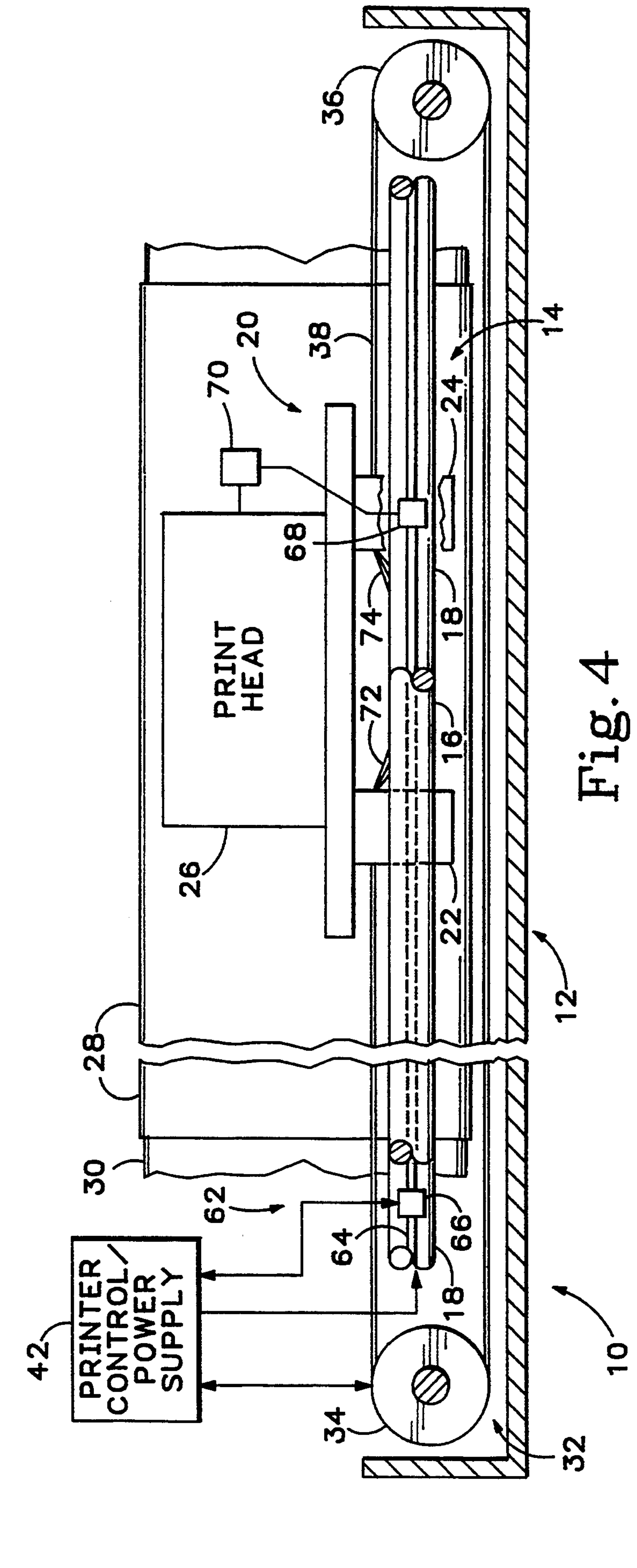
FIG. 4 is a third embodiment of the printhead of the invention.

In FIG. 4, a third form of optical data link is depicted generally at 62. Data link 62 includes a fiber optic cable 64, that is supported on chassis 12, which support in this instance is located in between rails 16, 18. An optical data transmitter 66 also is provided, as are an optical data receiver 68 and appropriate receiver circuitry 70.

In order to supply electrical energy to printhead 26 and to other power-requiring elements located on carriage 20, a source of electrical energy is provided by means of carriage support 14. Specifically, in the embodiments depicted herein, electrical energy is provided to rails 16 and 18, and electrical energy pickup elements 72, 74 are carried on electrical rail-engaging guides 22, 24 respectively. Appropriate insulation (isolation) is provided as by a high-resistance circuit that may include a DC-coupled link, e.g., a capacitor between pick-up elements 72 and 74. Such will be understood to provide a steady, relatively non-fluctuating power supply.

Figure 5:
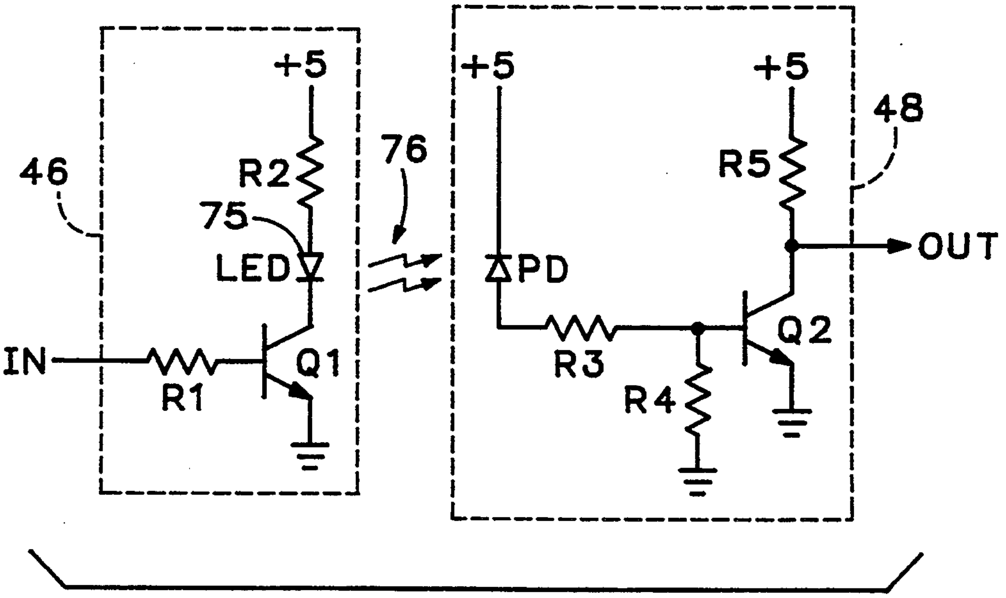
FIGS. 5 and 6 are schematic diagrams of the optical data link that forms a part of the invention.

Referring now to FIG. 5, optical data transmitter 46 and optical data receiver 48 may be seen to be operatively coupled by an optical control signal 76 passing therebetween. Transmitter 46 has associated therewith circuitry including a LED 75, and resistors R1 and R2. A suitable LED may be a Seimans Model No. SFH 480 GaAs LED, which has an on-off cycle of approximately 0.6–0.5 μsec. In the preferred embodiment, R1 has a value of 1 K Ω and R2 has a nominal value of 42.2 Ω. A transistor, Q1, is provided. Transistor Q1 may be transistor Model No. MNBR 5179, manufactured by Motorola, which may operate at a frequency sufficient to provide data transfer in excess of 1 Mbps. A first embodiment of optical data receiver 48 includes a photo-diode, PD, which may be a SFH 217 photo-diode manufactured by Seimens, which has an on-off time of approximately 2 nanoseconds, and is capable of providing data transfer at the requisite speed. Additional resistors R3, R4 and R5 are provided. In a specific embodiment of the invention, R3 may have a nominal value of 511 Ω, R4 may have a value of 178 Ω, while R5 may have a value of 1 KΩ. Q2, in the preferred embodiment, is also a MNBR 5179 model. Alternate embodiments may include a Telefunken LED Model No. TSIP 5201, which has a rise-fall time of less than 0.5 μsec, and/or an Telefunken photo-diode Model No. BPZ22F.

Figure 6:
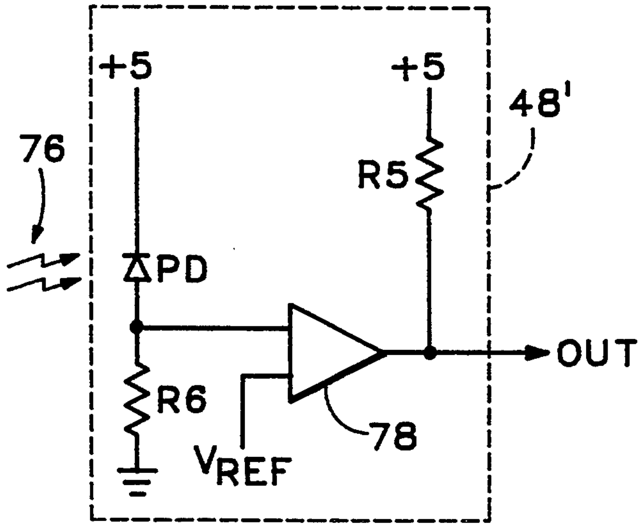

An alternative embodiment of optical data receiver 48, designated 48', is depicted in FIG. 6 and again includes a photo-diode, PD, for receiving signal 76. This embodiment utilizes a comparator 78 in place of transistor Q2. A resistor R6 is provided which must have a relatively large value, which for purposes of the circuit depicted in FIG. 6 means a resistance in excess of 100 K Ω. This circuit variation provides a photo-diode that is used to trigger comparator 78 as the photo-diode begins to conduct electricity. The advantage to this circuit is that a lower intensity light beam received at the photodiode will result in an output for the optical data receiver, whereas the transistor used in the preferred embodiment will require a higher intensity light beam in order to operate. The circuit of FIG. 6, however, may require additional shielding from ambient light, as by suitable filtering media, to prevent the reception of interfering light by optical data receiver 48'.

It should be appreciated that the optical data link, in all of its various embodiments described herein, preferably operate at a relatively high frequency, for example, the frequency, f, in terms of megabits/sec (Mbps), is determined by:

$$f = N \times dpi \times S$$

where N = number of nozzles and S = carriage speed in inches-per-second.

In the case of a high-resolution monochrome image, the printhead may be expected to have 100 nozzles, the resolution may be 300 dpi and the carriage may be 20 inches in length, resulting in a signal frequency of 0.6 Mbps. For a color printer, the printhead may be expected to have 300 nozzles, the resolution may be 300 dpi and the carriage may have a width of 20 inches, resulting in a frequency of 1.8 Mbps.

It will be appreciated that the invention finds utility in printer applications having a variety of widths, resolutions and nozzle arrangements, some of them requiring far less demanding optical link data rates. Various encoding protocols may be employed for data transfer, including FM0, FM1 encoded clock protocol.

Data integrity is always a concern in high-frequency data transfer. In the system described herein, data integrity may be maintained by adjusting the wavelength of the light used to transmit data, as by the use of selected optical filters which will preclude interference from ambient light, and by selectively focussing or defocussing the light beam transmitted through free air. If power modulation of the transmitted light beam is necessary due to loss of light strength over distance, the light beam might be intensity- or power-modulated as a function of carriage position relative to the transmitter, as the carriage position will be "known"by printer controller 42 through feedback from carriage drive motor 40.

Industrial Applicability

The described invention is suitable for use in printers using ink-jet or similar technology printheads, for producing a printer which has reduced RFI, ESD and EMI generating capabilities.

While the present invention has been shown and described with reference to the foregoing preferred embodiment and variations thereof, it will be apparent to those skilled in the art that other changes in form and detail may be made therein without departing from the scope of the invention as defined in the appended claims.

We claim:

1. A carriage assembly for use in a printer chassis comprising:

a carriage support for supporting a carriage for lateral movement relative to the printer chassis;

a carriage which is supported on said carriage support and which moves bi-directionally along a carriage path thereon;

a printhead mounted on said carriage for bi-directional movement with said carriage; and an optical data link for providing a printhead controlling signal to said printhead, said optical data link including an optical data transmitter fixed on said printer chassis for transmitting an optical signal and an optical data receiver mounted on said carriage for bidirectional movement with said carriage, said optical data receiver being configured to receive said optical signal from said optical data transmitter while said optical data receiver moves with said carriage along said carriage path.

2. The carriage assembly of claim 1 wherein said optical data transmitter includes a free-air optical data path between said optical data transmitter and said optical data receiver.

3. The carriage assembly of claim 1 wherein said optical data link includes a fiber optic cable mounted on said carriage support with one end of said fiber optic cable connecting to said optical data transmitter and another end connecting to said optical data receiver such that said optical data transmitter transmits said printhead controlling signal through said fiber optic cable to said optical data receiver during reciprocation of said carriage.

4. The carriage assembly of claim 1 wherein said carriage support includes dual parallel rails.

5. The carriage assembly of claim 1 wherein said carriage support provides a source of electrical energy for said carriage and wherein said carriage includes continuous-contact electrical energy pickup elements for receiving electrical energy from said carriage support.

6. The carriage assembly of claim 1 wherein said optical data link includes at least one optical element taken from the group consisting of focused LED, non-focused LED, IR diode, IR emitter and laser diode.

7. The carriage assembly of claim 1 which further comprises a control signal modulator for modulating the intensity of said printhead controlling signal as a function of carriage location relative to said optical data transmitter to maintain a consistent intensity of said printhead controlling signal at said optical data receiver during reciprocation of said optical data receiver with said carriage.

8. The carriage assembly of claim 1 wherein said printhead control signal represents sequential print data and wherein said carriage includes a data buffer carried thereon for storing said sequential print data.

9. The carriage assembly of claim 1 wherein said optical data link includes a data compression circuit.

10. A carriage assembly for use in a printer chassis comprising:

a carriage support for supporting a carriage for lateral movement relative to the printer chassis;

a carriage which is supported on :said carriage support and which moves bi-directionally relative to the printer chassis along a carriage path;

a printhead mounted on said carriage for bi-directional movement with said carriage; and a free-air optical data link for providing a printhead controlling signal to said printhead, said optical data link including an optical data transmitter which is fixed to said printer chassis and an optical data receiver which is fixed to said carriage, said optical data receiver being configured to receive said optical signal from said optical data transmitter over a free-air optical data path while said carriage reciprocates along said carriage path.

11. The carriage assembly of claim 10 which further comprises a control signal modulator for modulating the intensity of said printhead controlling signal at said optical data transmitter as a function of carriage location relative to said optical data transmitter to maintain a consistent intensity of said printhead controlling signal at said optical data receiver during reciprocation of said optical data receiver with said carriage.

* * * * *